(12) United States Patent
Debry

(10) Patent No.: US 6,314,521 B1
(45) Date of Patent: *Nov. 6, 2001

(54) SECURE CONFIGURATION OF A DIGITAL CERTIFICATE FOR A PRINTER OR OTHER NETWORK DEVICE

(75) Inventor: Roger K. Debry, Longmont, CO (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/979,505

(22) Filed: Nov. 26, 1997

(51) Int. Cl.[7] .................................................. H04L 9/32
(52) U.S. Cl. .................................................. 713/201
(58) Field of Search .................................... 713/201, 176, 713/171; 380/30, 51; 709/206, 229

(56) References Cited

U.S. PATENT DOCUMENTS

| | | | |
|---|---|---|---|
| 5,450,493 | * | 9/1995 | Maher .................................. 380/30 |
| 5,633,932 | * | 5/1997 | Davis et al. ........................ 380/51 |
| 5,692,048 | * | 11/1997 | Gormish et al. .................... 380/51 |
| 5,708,780 | * | 1/1998 | Levergood et al. ................ 709/229 |
| 5,751,809 | * | 5/1998 | Davis et al. ........................ 713/176 |
| 5,878,144 | * | 3/1999 | Aucsmith et al. .................. 380/30 |
| 5,884,033 | * | 3/1999 | Duvall et al. ...................... 709/206 |
| 5,956,154 | * | 9/1999 | Cairo .................................. 358/434 |
| 5,970,147 | * | 10/1999 | Davis .................................. 713/172 |
| 6,028,933 | * | 2/2000 | Heer et al. .......................... 713/169 |

* cited by examiner

Primary Examiner—Tod Swann
Assistant Examiner—Matthew Smithers
(74) Attorney, Agent, or Firm—Romualdus Strimaitis; Lawrence R. Fraley; Bracewell & Patterson, L.L.P.

(57) ABSTRACT

The system, method, and program of this invention provides a secure configuration of a digital certificate for a printer. The printer has a unique encryption key stored in it at manufacturing time. This key is also recorded in a database, securely controlled by a certificate authority, and the key is associated with the printer by model and serial number. The printer sends a message requesting a digital certificate to the certificate authority. In the message request, the printer sends the model number and serial number of the printer in the clear, i.e., not encrytped, which is needed by the certificate authority to look up the unique encryption key in the database. The message request also contains an encryption, using the built-in key, of some of the same information that was sent in the clear. The database needs the information in the clear to get the key. Then, the database uses the key from its database to decrypt the encrypted part of the message, and compares it to the part of the message that was sent in the clear. If it matches, then the program operating with the database knows that the message has not been tampered with and that the printer is who it says it is. The database machine then creates the digital certificate and encrypts the certificate with the key from its database corresponding to that printer. The encryption key is a secret key only known by the printer and the database. The encrypted certificate is sent to the printer and stored in the printer for use in authenticating itself to others.

10 Claims, 3 Drawing Sheets

| Field | Description | Examples |
|---|---|---|
| Subject's distinguished name | A name uniquely identifying the owner of the certificate | C=US, O=MyCompany, OU=Building 003,CN=Printer 5 |
| Issuer's distinguished name | A name uniquely identifying the certificate authority that signed the certificate | C=US, O=IBM, CN=IBMPrinters |
| Subject's public key | The owner's public key, in this case the printer's public key | 512-bit RSA key |
| Issuer's signature | The certificate authority's digital signature from which the certificate derives its authenticity | RSA encryption with MD5 hash |
| Validity period | Dates between which the certificate is valid | Not before January 1, 1997<br>Not after January 1, 2007 |
| Serial number | A unique number generated by the certificate authority for administrative purposes | 123456 |

SECURE CONFIGURATION OF A DIGITAL CERTIFICATE FOR A PRINTER OR OTHER NETWORK DEVICE

CROSS-REFERENCE TO RELATED APPLICATION

This application is related by common inventorship and subject matter to copending patent application Serial No. 08/978,793 entitled "SYSTEM, METHOD, AND PROGRAM FOR PROVIDING WILL-CALL CERTIFICATES FOR GUARANTEEING AUTHORIZATION FOR A PRINTER TO RETRIEVE A FILE DIRECTLY FROM A FILE SERVER UPON REQUEST FROM A CLIENT IN A NETWORK COMPUTER SYSTEM ENVIRONMENT" filed on even date herewith, assigned to the Assignee hereof and entirely incorporated herein by this reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to a network of computer systems, including but not limited to the Internet environment, and more specifically for authenticating a printer in the network environment.

2. Description of the Related Art

A network environment can comprise an endless number of configurations, including but not limited to computer systems communicatively connected to the Internet, to a wide area network, to a local area network, using TCP/IP connections, using token ring connections, etc. Likewise, the computer systems themselves may vary from network terminals with minimal storage and CPU processing functionality to personal computers including laptop computers to workstations to servers to mainframes. The relationship among the computers can vary, e.g., as being independent from each other, or having distributed relationships, or having client/server relationships, etc. Some or all of the files may be stored in a dedicated file storage system, e.g., a file server, database management system, etc., or within the storage of each system. Likewise, printers may be attached to any or all of the systems and/or there may be print servers to which the computer systems can be communicatively linked.

There are many different types of security issues that arise in a network environment. Some files must be encrypted at the sending end and decrypted at the receiving end to ensure that the file contents are not intercepted by an unauthorized entity during the transmission. This security feature, along with other security features that are known, can guarantee that a file has not been tampered with or can ensure the identity of the sender or receiver. Some of these security features are further discussed below.

Cryptograph

Conventional cryptography, or in other words traditional symmetric cryptography, is used to maintain the privacy of the information contents. Conventional cryptography requires that the sender and receiver of an encrypted message share the same secret key. The same key is used to both scramble (encrypt) and unscramble (decrypt) information. In 1977, the National Bureau of Standards approved a block cipher algorithm referred to as the Data Encryption Standard (DES). Binary-coded data is protected by using the DES algorithm in conjunction with a key. An authorized user must have the key that was used to encipher the data in order to decipher it. Unauthorized recipients of the ciphered information content who may know the DES algorithm but who do not know the key cannot decipher the information content.

The major problem with this method is guaranteeing that both sender and receiver have the key but no one else does. Sharing the key requires that one party send it to the other. However, since most communication networks cannot be trusted, the key itself must be encrypted. If it is sent in the clear, there is a danger that someone eavesdropping on the line could get the key and then be able to decode messages sent between the two parties. Others have sent the key via registered mail, which slows the communication process down, and begs the question of why not just send the message registered mail if time is not of the essence.

As described above, to protect the information content from unauthorized recipients, the key has to be kept secure from unauthorized users. Thus, the security of the contents depends upon the security of the key. As such, the key has to be distributed to authorized users in a secure manner.

Public Key Cryptography

Public key cryptography was first introduced by Whitfield Diffie and Martin Hellman of Standford University in 1976. It not only can be used to ensure the privacy of transmitted messages, but it can also be used in other applications, including digital signatures.

For ensuring the privacy of transmitted messages, public key cryptography does solve many of the problems, discussed above, of securely distributing the key used in conventional cryptography.

Public key cryptography is based on two keys, a private key and a public key, that work together. A person's public key is openly made available to others, while their private key is kept secret. One key is used for ciphering and the other key is used to decipher information content. For each encryption key there is a corresponding, but separate and distinct, decryption key. Messages encrypted with a person's public key can only be decrypted with that person's private key. Even if one key is known, it is not feasible to compute the other key.

In a public key system, it is possible to communicate privately without transmitting any secret key. For example, the encryption key for each user is made public by being distributed or published. Anyone desiring to communicate in private with a recipient merely encrypts the message under the recipient's public key. Only the recipient, who retains the secret decrypting key, is able to decipher the transmitted message.

A combination of conventional cryptography and public key cryptography allows a secret key to be sent securely to an intended recipient. The sender encrypts a message with the secret key using the recipient's public key. The recipient then uses the recipient's private key to decrypt the message and to get the secret key for other transmissions. Since public key encryption is slower than secret key encryption, this approach allows subsequent transmissions to use the faster conventional secret key cryptography approach.

Digital Signatures

In these cryptographic systems, there is sometimes still a need to verify that the sender of a received message is actually the person named in the message. Digital signatures, which are based on public key cryptography, are used as a means to authenticate the sender of a message. A digital signature allows a digital message to be signed so that any receiver of a digitally-signed electronic message can authenticate the sender of the message and verify the integrity of the signed message. That is, the recipient is assured that the message is received as sent, and that it is not a forgery.

To ensure that the original true sender sent the message, a process just the opposite of the one used to ensure a private communication using public key cryptography described above is used. For example, a user who has made public a public key can digitally sign a message by encrypting the message, or a hash of it, with the user's private key before transmitting the message. Recipients of the message can verify the message or signature by decrypting it with the sender's public encryption key. This process is just the opposite of conventional cryptography in that the message is first encrypted by the sender using the sender's private key and decrypted by the recipient using the sender's public key. Anyone who has the sender's public encryption key can read the message or signature. Any such recipient is assured of the authentication of the creator of the message since only the sender having the secret private key could have created the message or signature. The recipient is also assured that the message has not been altered since it was first created and the digital signature was attached to it. Any recipient can authenticate the digital signature and verify the integrity of the message by using only the signer's public key.

In the above example, the digital signature was the encryption, using the sender's private key, of the message itself. In the Digital Signature Standard (ANSI X9.30 Part I) a person's digital signature is a fixed-length string of bits that are attached to an electronic message of any length. To create a fixed-length digital signature, a hashing function is used that converts a message of any length to the same fixed-length hash, or digest, of the message. The Secure Hash Algorithm (SHA) is a known hash function that is part of the Digital Signature Standard. This hash of a message is like a fingerprint" in that it is practically impossible for two distinct messages to result in identical hashes. After creating a hash of the message, the sender's private key is applied to the hash to create the digital signature for the message. The digital signature is a function of both the message being signed and the signer's private key. As long as the private key is kept secret, the digital signature cannot be created by anyone else.

Upon receipt of the digitally-signed message, the recipient uses the sender's public key to convert the digital signature to the hash that the sender computed. Next, the recipient applies the same hash function to the plain text message received and gets the hash of the received message. If the hash of the received message is identical to the hash obtained by using the sender's public key to convert the digital signature, then the recipient has authenticated the sender's digital signature and verified the integrity of the signed message.

Certificates

The identity of the signer can only be guaranteed to the extent that the receiver is assured that the public key actually belonged to the purported sender. One known technique for addressing this problem is to rely on some trusted authority, e.g., a government agency, to ensure that each public key is associated with the person claiming to be the owner. The trusted authority would create a digital message, known as a certificate, which contains the claimant's public key and the name of the claimant. A representative of the authority would sign the digital message with the authority's own digital signature. The authority's digital signature would be created by using the authority's private key, and it would be deciphered by recipients using a public key of the authority which has been widely disseminated and made available such as through telephone books, newspapers, and/or on an Internet web page. This certificate is sent along with the sender's message and the sender's digital signature. The recipient uses the authority's public key to decipher the certificate and find the sender's authentic and certified public key. The recipient then uses the sender's certified public key to verify the sender's signed message. Thus, the certificate can be easily authenticated and the message integrity verified.

Access Control Using Certificates

Typically, access to resources of a computer system ("server") from another system or user ("user") has been controlled through passwords. This requires the server to maintain a database of all authorized users and each user's password. However, if a user shares the password with another unauthorized user, the integrity of the password access control system is diminished.

In a certificate-based access control system, the server only needs to authenticate certificates issued by a certification authority. The server does not need to maintain a database about users or each user's corresponding password. To gain access to resources of the server, the user submits the user's certificate. From the certificate, which contains unforgeable data, the server can obtain the user's authenticated public number, personal data, and access privileges. The server can then transmit to the user a random message that the user must digitally sign with the user's private number and return it to the server. The server can then authenticate the digital signature using the public number in the certificate and check that the signed message is the same it sent to the user. With this digitally-signed response, the server can determine if the user has the correct private number corresponding to the authenticated public number in the certificate.

Secured Transmissions Between a Sender and Receiver

The above-described secure transmission techniques are best applied in situations where the messages and/or files are transmitted directly between the sender and the intended user.

In any network environment, situations may arise where a user (an individual interacting with a system via a terminal or an application running on a system) desires to print a document that is located remote from the user. The document may be protected from being accessed by anyone other than those users that have access privileges.

Typically, a user will request the document from the remote system, the remote system will verify that the user has the correct access privileges, and if so, then the remote system will send a copy of the document to the user. The user will then send the file to a printer for printing. However, such a user having access privilege may desire to print the document on a remote printer or print server but does not desire to first retrieve and store the document at the user's own local computer system (referred to for convenience as the client system). For various reasons, a user may not wish to have the document resident on the user's own machine. Some of these reasons may involve, for example, any one or more of the following: the client system may not be in a secure environment; there may be network traffic considerations; or the client system may not have the storage space for receiving the file, etc. In addition, the file server may not want a copy of the file to be stored on the client system. The owner of the file (e.g., document) may wish to control the number of copies being distributed, e.g., to protect copyright in the document and/or payment of a fee on a per-copy basis. If a copy were resident on the client machine, illegal copies could be further made from that copy, or illegal changes could be made to the document. Instead, it may be more desirable if the printer could get the document directly from wherever it may be stored and print the document.

However, in order to do this, the printer would need to have the same access privileges as the user had if the document was access protected.

There is a need to allow a print server to get a print file from a third party identified in an original request so that the document can be printed without first obtaining the file by a client system originally requesting the print file. However, when the print server gets the file, the third party must be guaranteed that the request is valid (i.e., the print server has been authorized to get the file, and the original client can legally print the document). Such a scenario is not known to be possible under existing protocols.

printer Security

There are security issues involved with printing, and even more so when the printing involves network communication links that are not secure, e.g., the Internet. One aspect of more secure printing involves granting administrative access to a device, such as a printing device, on the network. Several vendors provide tools to aid in the installation and configuration of network attached printers. These tools allow a user to configure the printer, set defaults, and even download flash memory. These are powerful and necessary tools for an administrator dealing with the management of large networks of printers. However, in the wrong hands, these tools can be used to completely disable a printer, or potentially damage the entire network. Therefore, printers, themselves, need to be protected from malicious attacks. Simple ID and password protection may not be sufficient, especially if a printer is accessible from the Internet or from outside a firewall.

Since it is now common for critical data to be printed via a network that is not totally within a user's own controlled boundary, the user needs to know that the printer, or printing system, or other output device is the one that the user believes it to be. For example, when printing the payroll, one would like to be assured that the payroll checks are really going to a specific printer, that the data has not been tampered with, and that an intruder has not captured the data. It is desirable for a user to be able to authenticate a printer, i.e., validate that the printer is really the printer that it claims to be.

Currently, there is a significant security exposure in printers attached to networks in that there is no way to authenticate that a printer really exists at a specified network address. That is, software could be used to fool the system or a potential user into thinking that a printer was at a network address, but print data sent to that address could be misappropriated by hostile software and used for other purposes.

Although digital certificates are used in computing systems to authenticate parties who will trade information, currently secure printers, i.e., printers that are capable of authenticating themselves to a user or a foreign system, are nonexistent.

SUMMARY OF THE INVENTION

It is therefore an object of this invention to ensure that a printer, printing system, or other network device is the actual device the communicating sender assumes it to be.

It is therefore a further object of this invention to provide a secure means to configure a digital certificate in a network printer or other network device.

In order to enable a network device to operate in a secure way on a network, the system, method, and program of this invention provides a means for a network device to identify itself The network device identifies itself in a way analogous to the way individuals identify themselves using a passport or driver's license that has been issued by a trusted authority. A trusted authority gives a certificate to the network device that guarantees that the device is who the device says it is.

Although the preferred embodiment herein involves a secure configuration of a printer's digital certificate, the invention is applicable to other network devices including, but not limited to, fax machines, modems, personal digital assistants, cellular telephones, or other communication devices.

Using a printer as a specific example, when a printer is manufactured, a unique data encryption key is built into the printer. The unique key and the corresponding model and serial number (or other unique identifier) of the printer are maintained in a secure, network (e.g., web) accessible database server. For example, such a secure database server may be maintained by each printer manufacturer. For example, IBM would have a web site storing the keys for all new printers that IBM built.

When an administrator configures a printer, the administrator may also choose to configure a digital certificate. The printer provides a "configure digital certificate" option as part of the configuration process. When this option is selected, the following events occur:

First, the printer establishes a session (e.g., an HTTP session) with the database where the encryption key built into the printer is stored.

Second, the printer sends a two-part message to the server. The first part of the message contains the printer model and serial number, the printer's network address (e.g., IP address), and a request for a digital certificate. This first part of the message is encrypted with the encryption key built into the printer. The second part of the message contains the same data (information) as the first part, but the second part of the message is sent in the clear.

Third, the server decrypts the message, by using the printer's unique key in its database, and compares the decrypted message with the clear message. If both parts of the message match, then the server knows that the printer is authentic. No one else could have encrypted the message with the printers unique key. The server also knows that the message came from the given network address.

Fourth, the server builds a digital certificate for the printer, registering itself as the certificate authority. The server then encrypts the content of the digital certificate with the certificate authority's private key, and sends it to the printer. Since the digital certificate is encrypted, it is safe to transmit. It should be noted that the content of the digital certificate conforms to the international standard, X.509, for digital certificates. As such, the digital certificate includes a new public/private key pair for the printer.

Fifth, the database at the certificate authority server stores the new public key just sent to the device. The public key is then advertised for this printer and is used in all subsequent secure transactions with this printer.

Sixth, the printer decrypts the digital certificate using the certificate authority's public key, and stores it in nonvolatile memory in the printing system.

Consequently, whenever a printer is requested to authenticate itself, it can do so by using the newly-configured digital certificate.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

Although the preferred embodiment herein involves a secure configuration of a printer's digital certificate, the invention is applicable to other network devices including, but not limited to, modems, personal digital assistants, cellular telephones, or other communication devices.

To set up a secure printing environment, a digital certificate is configured into the printer. Many actions carried out by or on the computer require that the printer authenticates itself. For example, when setting up authorization to change printer configuration, an operator would like to be assured that the operator is communicating with the intended printer. Otherwise, sensitive data, including passwords, could be compromised. Also, before a sensitive file is sent to the printer for printing, the sender wants to be assured of the true identity of the printer.

Figure 1:
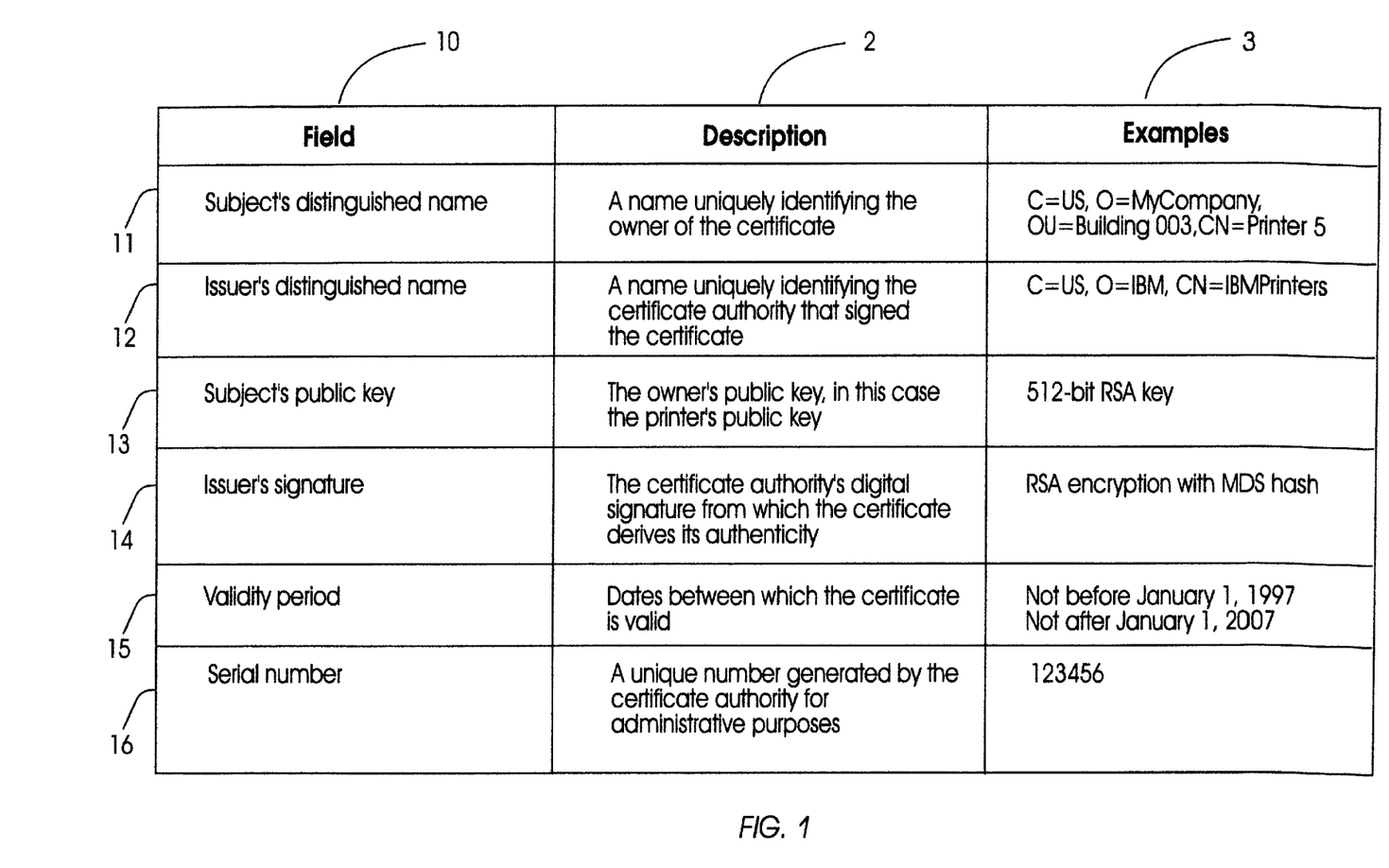
FIG. 1 describes an X.509 digital certificate used in the present invention.

In order to operate as a secure printer, a printer must be capable of authenticating itself. To enable a printer to authenticate itself in a network including today's open Internet environment, the system, method, and program of this invention uses an X.509 digital certificate. The fields 10 of an X.509 digital certificate are shown in FIG. 1 along with a description 2 of the fields 10 and an example 3 of the use of those fields by the invention as described herein.

Figure 2:
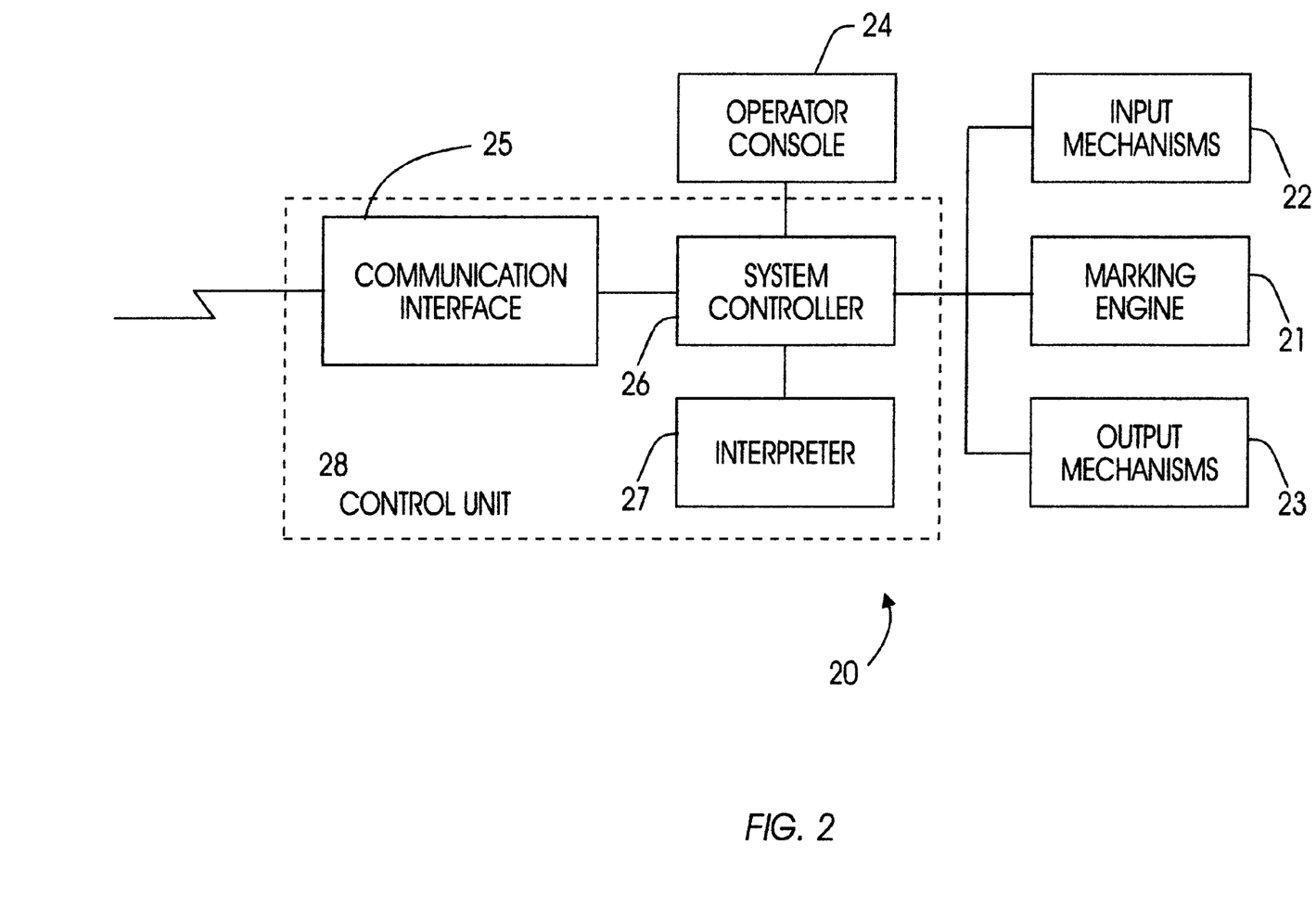
FIG. 2 is a block diagram of a printer.

FIG. 2 shows the components of a printer 20. It should be noted that the invention is applicable, also, to other types of printers that may have configurations that are different from the configuration described in accordance with FIG. 2.

With reference to the printer 20, the input mechanisms 22, the marking engine 21, and the output mechanisms 23 are physical mechanisms that are 10 driven by software or microcode in the system controller 26, which is essentially a computer. The marking engine 21 takes the bit map images and transfers them onto the paper or other printing medium. The means for transferring may include rotating a drum or modulating a laser beam or depositing ink, etc., depending upon the type of printer, e.g., an electrophotographic printer or a laser printer or an ink jet printer, etc. The input mechanism 22 moves the paper or other print medium from the input tray or trays, at just the right time and from the right tray, and moves the paper into the marking engine 21. The output mechanism 23 transports the paper to the output tray or trays. The operator console 24 is typically just a few buttons for the operator to select functions and a few lights or indicators that tell the operator the status of the printer. The operator console may also consist of a keypad and a display screen. The operator console for some printers may be a computer itself with a monitor and keyboard. The control unit 28 consists of the communication interface 25, the interpreter 27, and the system controller 26. The communication interface 25 is the interface between the printer and the physical communication wire and communication card. It uses the printer's configured communication protocol to accept the data coming in and to buffer the data. The interpreter 27 takes the actual print data and generates the bit maps that will be used by the marking engine 21 to put the text/image on the paper. For example, it may interpret postscript commands if it is a postscript-enabled printer. The code, software and/or microcode resides in the system controller 26 which is the master program that coordinates all of the printer's activities and functions.

Figure 3:
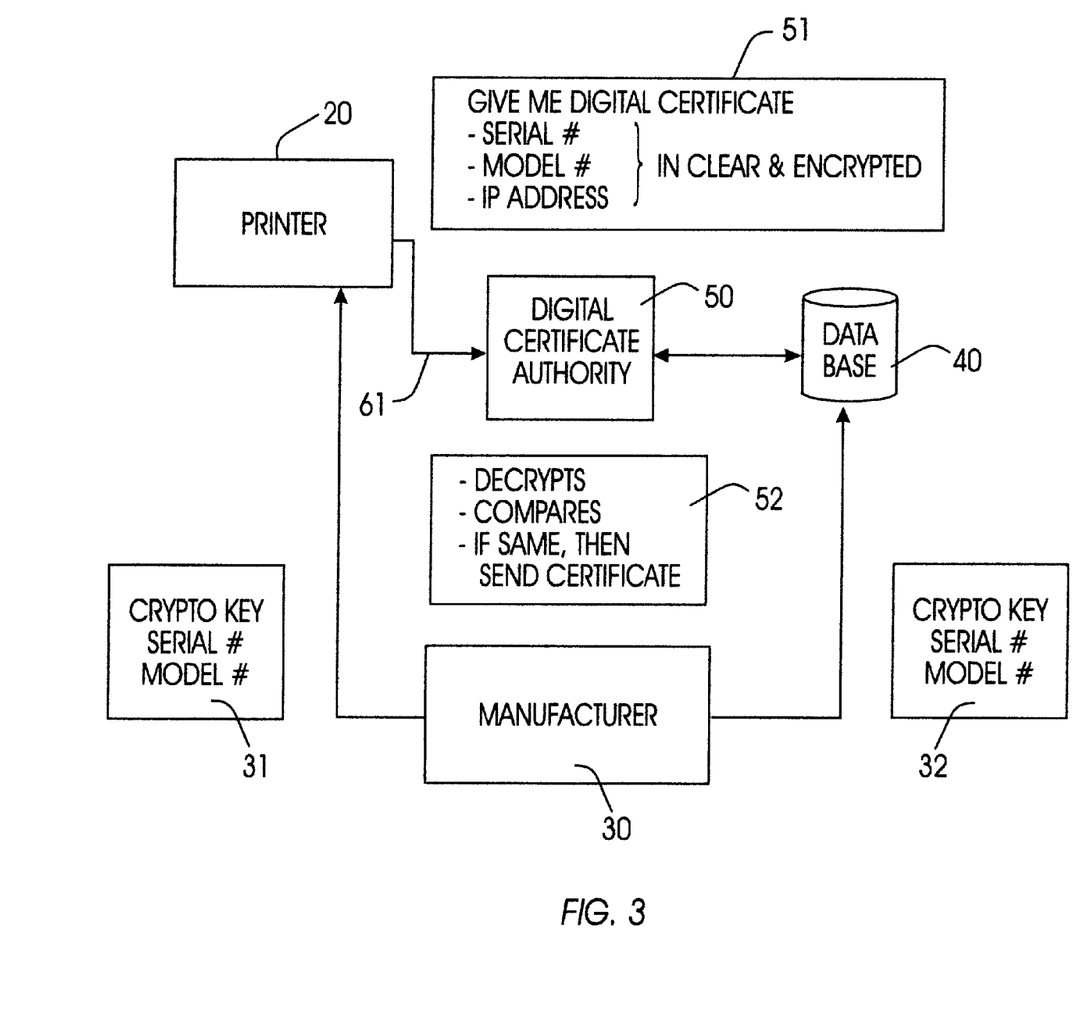
FIG. 3 is a flow diagram of the steps carried out by a printer manufacturer, a printer, a database, and a digital certificate authority to create a digital certificate for a printer.

The following describes, with reference to FIG. 3, how a printer, e.g., printer 20, gets a digital certificate in order to be able to authenticate itself and operate in a secure way.

When a printer is manufactured by a manufacturer 30, e.g., by IBM, the manufacturer gives each printer a serial number and a model number (or other unique identifier), and builds into each printer a unique encryption key, step 31. This key can be embodied in the printer hardware such as through mechanical or electrical switches or embodied in some persistent storage. For a secure embodiment, the key is embodied in such a way that it is tamper proof and not discernible. Its only use is by the printer controller 26 (FIG. 2) for encrypting a message that requests a digital certificate, or for decrypting the private key of the public/private key pair issued by the certificate authority.

The encryption key is a random set of bits. The strength of the key is dependent upon and determined by the length of the random bits. The longer the length of bits, the stronger the key. The set of bits are used to generate the encrypted data in a message requesting a digital certificate.

The manufacturer then records the key, the model number, and the serial number in a database 40. The key is associated with the printer by the printer's model number and serial number in the database.

The database 40 is located in a secure server which also acts as a digital certificate authority 50, i.e., capable of issuing and validating digital certificates. The digital certificate authority 50 may be a completely separate entity from the manufacturer 30, or the certificate authority could be the manufacturer or closely connected thereto.

When an administrator installs a printer, and connects it into a network, the administrator will instruct the printer to get its digital certificate. Through the interface 24 (FIG. 2), i.e., the operator console, to the printer's computer, i.e., the system controller 26 (FIG. 2), the administrator causes the printer to initiate a session over the network 61 with the server 50, 40 having the digital certificate authority 50 and the database 40.

The operator/administrator of the printer initiates the process for requesting a digital certificate. When an administrator directs the printer 20 to "configure" its digital certificate, the following events occur.

The printer 20 initiates an HTTP session 61, or other session type if the network is other than the Internet, with the certificate authority 50. Using the encryption key built in at manufacturing time, the printer 20 encrypts a message containing the printer's model number, serial number, and IP address. It then appends to this, in the clear, the model number and serial number, and sends this message to the certificate authority, step 51.

The certificate authority 50 receives the message. As shown in step 52, using the model number and serial number sent in the clear, the certificate authority 50 looks up in the database 40 the printer's encryption key and uses it to decrypt the encrypted part of the message. The certificate authority 50 then compares the model number and serial number sent in the encrypted part of the message with the model number and serial number it used to find the encryption key. The certificate authority 50 then checks to see if the IP address, i.e., network address, found in the encrypted part of the message matches the IP address the message was sent from. If all of these match, then the certificate authority 50 knows that the message really came from the printer. This is known because only the printer could have encrypted the message with the unique key stored in the CA's database, and the printer is really at the IP address the message was sent from.

The certificate authority now generates a unique public/private encryption key pair for the printer and builds a digital certificate having the fields as shown in FIG. 1 including a distinguished name of the printer 11, the issuer's distinguished name 12, the public key 13, the issuer's digital signature 14, the validity period 15, and a serial number 16.

The new private key, along with the digital certificate, is encrypted using the printer's hardware encryption key and sent to the printer.

The printer decrypts the new private key and the digital certificate using the "built" in key. The hardware key is essentially replaced with the new private key. The printer now has a valid digital certificate and a private/public key pair for subsequent communications. However, in some embodiments, the hardware key is kept for any subsequent requests for a digital certificate from the certificate authority when the validity period of the current digital certificate expires, when other failures might occur, or if the public/private encryption keys are ever compromised for any reason.

As shown and described above, the information for a digital certificate is sent in such a way that the receiver (i.e., the certificate authority and database owner) can guarantee that it has not been tampered with and that the information really came from the printer with that serial number at that network address. In addition, the encryption key stored in the database, which was built into the printer during its manufacture, is used to encrypt the digital certificate that is sent back to the printer so the digital certificate cannot be intercepted or stolen.

Once a printer is authenticated, such as by the secure configuration of a digital certificate described herein, there are a set of security issues that must be addressed to guarantee that the data has not been tampered with on its way to the printer. Other secure printing considerations include privacy (others cannot look at the print data), user authentication and authorization (the user is who he claims to be and is authorized to perform the operation), nonrepudiation (the user really asked for the operation), and protection from "man-in-the-middle" and "replay" attacks. Some of these issues are addressed in copending patent application Serial No. 08/978,793 which is herein incorporated by reference.

Using the foregoing specification, the invention may be implemented as a machine, process, or article of manufacture by using standard programming and/or engineering techniques to produce programming software, firmware, hardware, or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, diskettes, optical disks, magnetic tape, semiconductor memories such as RAM, ROM, Proms, etc. Transmitting devices include, but are not limited to, the Internet, intranets, electronic bulletin board and message/note exchanges, telephone/modem-based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, printers, or any subcomponents or individual parts of one or more processing systems, including software, firmware, hardware, or any combination or subcombination thereof, which embody the invention as set forth in the claims.

One skilled in the art of computer science will easily be able to combine the software created as described with appropriate general purpose or special purpose computer hardware to create a computer system and/or printing system and/or computer subcomponents embodying the invention and to create a computer system and/or printing system and/or computer subcomponents for carrying out the method of the invention.

While the preferred embodiment of the present invention has been illustrated in detail, it should be apparent that modifications and adaptations to that embodiment may occur to one skilled in the art without departing from the spirit or scope of the present invention as set forth in the following claims. For example, some modifications and adaptations are discussed below.

It should be noted that the terms "file" and "document" are used interchangeably herein with the intended meaning that any document is also a file, although a file may not necessarily be limited to documents. Even when the term "document" is used, its broader "file" meaning is intended since the term document is being used merely as an example of a file.

Also, the terms printer, print server, and printing system are used interchangeably herein. The printer is assumed to have the necessary functional capabilities to perform the required functions whether those functional capabilities are in a stand-alone printer connected to a network or a printer connected to a server, i.e., computer, that manages the functions of the printer and device queuing where the server is dedicated solely to such function or as part of its other functions such as a workstation computer, etc.

I claim:

1. A process for configuring, across the Internet, a digital certificate for a network devise, the process comprising:

building a secret data encryption key into a network devise when the network devise is manufactured;

maintaining the secret key and a corresponding unique identifier of the network device in a database server accessible over the Internet;

sending, across the Internet from the network devise to the database server, a two-part message wherein the first part contains the unique identifier, the IP address of the network devise and a request for a digital certificate, and wherein the first part is encrypted using the built-in secret key, and wherein the second part of the message has at least some of the same information as the first part of the message, including the unique identifier, but is not encrypted;

determining, by the database server, the secret key from the database using the unique identifier received in the second part of the message;

decrypting, using the secret key form the database, the first part of the message;

comparing the information in the decrypted first part of the message with the information in the second part of the message; comparing the IP address from which the message was received and the IP address specified in the message; and sending an encrypted digital certificate which includes a public key and an encrypted new private key to the network devise if the information matches and the IP addresses match.

2. A process for configuring a digital certificate for a network device in a network environment, the process comprising:

embodying a secret key into the device;

storing by an equity responsible for embodying the secret key, the secret key and a unquiet identification number of the device in a secure database accessible by the entity and a certificate authority;

receiving, by a certificate authority, a two-part message from the network device requesting a digital certificate wherein the first part of the message includes the unique identification number and the second part of the message is an encryption of the first part of the message encrypted with the secret key;

determining, by the certificate authority, the secret key from the database using the unique identification number;

decrypting, using the secret key from the database, the second part of the message;

comparing the decrypted message with the first part of the message; and sending an encrypted digital certificate which includes a public key and an encrypted new private key to the network devise if the two-parts match.

3. The process of claim 2 wherein the network device is a fax machine.

4. The process of claim 2 wherein the network device is a printer.

5. The process of claim 2 wherein the network device is a modem.

6. The process of claim 2 wherein the entity embodying the secret key and the certificate authority are a same entity.

7. The process of claim 2 wherein the entity embodying the secret key is a manufacturer of the network device, and wherein the secret key is embodied in the device when the device is manufactured.

8. A computer system having a database, the computer system comprising:

means for receiving a secret key and a correspondence unique identification number of a network device from an entity responsible for embodying the secret key into the network device;

means for storing the secret key and the corresponding unique identification number in the database;

means for receiving a two-part message from the network device requesting a digital certificate wherein a first-part of the message includes the unique identification number and the second part of the message is an encryption of the first part of the message encrypted by the network device using the embodied secret key;

means for accessing the database to find the secret key associated with the unique identification number from the first part of the message;

means for decrypting the second part of the message using the secret key from the database;

means for comparing the decrypted second part of the message with the first pat of the message; and means for sending to the network deice and encrypted digital certificate which includes a public key and an encrypted new private key if the decrypted part of the message matches the first part of the message.

9. A computer program, on a computer-usable medium, comprising;

means for enabling receipt of a secret key and a correspondence unique identification number of a network device from an entity responsible for embodying the secret key into the network device;

means for causing the secret key and the corresponding unique identification number to be stored in a database;

means for enabling receipt of a two-part message from the network device requesting a digital certificate wherein a first part of the message includes the unique identification number and the second part of the message is an encryption of the first part of the message encrypted by the network device using the embodied secret key;

means for causing an access to the database to find the secret key associated with the unique identification number from the first part of the message means for causing a decryption of the second part of the message using the secret key from the database;

means for comparing the decrypted second part of the message with the first part of the message; and means for causing an decrypted digital certificate which includes a public key and an decrypted new private key to be sent to the network device if the decrypted part of the message matches the first part of the message.

10. A method executed in a computer system having a database, the method comprising:

receiving a secret key and a corresponding unique identification number of a network device form an entity responsible for embodying the secret key into the network device;

storing the secret key and the corresponding unique identification umber in the database;

receiving a two-part message from the network device requesting a digital certificate wherein a first part of the message includes the unique identification number and the second part of the message is an encryption of the first part of the message encrypted by the network device using the embodied secret key;

accessing the database to find the secret key associated with the unique identification number from the first part of the message;

decrypting the second part of the message with the first part of the message; and sending to the network device an encrypted digital certificate which includes a public key and an encrypted new private key if the decrypted pat of the message matches the first part of the message.

* * * * *